US009084199B2

(12) United States Patent
Zou et al.

(10) Patent No.: US 9,084,199 B2
(45) Date of Patent: Jul. 14, 2015

(54) UTILIZATION OF OVERHEAD CHANNEL QUALITY METRICS IN A CELLULAR NETWORK

(75) Inventors: Jialin Zou, Randolph, NJ (US); Hongwei Kong, Denville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 1652 days.

(21) Appl. No.: 10/954,755

(22) Filed: Sep. 30, 2004

(65) Prior Publication Data

US 2006/0072508 A1 Apr. 6, 2006

(51) Int. Cl.
*H04B 7/216* (2006.01)
*H04W 52/12* (2009.01)
*H04W 28/18* (2009.01)
*H04W 36/20* (2009.01)
*H04B 17/382* (2015.01)
*H04W 48/08* (2009.01)
*H04W 52/14* (2009.01)
*H04W 84/04* (2009.01)

(52) U.S. Cl.
CPC ............ *H04W 52/12* (2013.01); *H04B 17/382* (2015.01); *H04W 28/18* (2013.01); *H04W 36/20* (2013.01); *H04W 48/08* (2013.01); *H04W 52/146* (2013.01); *H04W 84/042* (2013.01)

(58) Field of Classification Search
USPC ...................... 370/332; 455/452.1, 452.2, 561
See application file for complete search history.

(56) References Cited

U.S. PATENT DOCUMENTS

| 6,141,388 A * | 10/2000 | Servais et al. ................. 375/262 |
|---|---|---|
| 2002/0102983 A1* | 8/2002 | Furuskar et al. .............. 455/452 |
| 2003/0081572 A1 | 5/2003 | Kim |
| 2003/0123396 A1* | 7/2003 | Seo et al. ....................... 370/252 |
| 2003/0129989 A1* | 7/2003 | Gholmieh et al. ............ 455/452 |
| 2003/0156556 A1 | 8/2003 | Puig-Oses |
| 2003/0206541 A1* | 11/2003 | Yun et al. ....................... 370/337 |
| 2004/0110473 A1* | 6/2004 | Rudolf et al. ................... 455/69 |
| 2004/0151122 A1* | 8/2004 | Lau et al. ....................... 370/252 |
| 2005/0113106 A1* | 5/2005 | Duan et al. ................. 455/452.2 |
| 2005/0283715 A1* | 12/2005 | Sutivong et al. .............. 714/790 |

OTHER PUBLICATIONS

Liangehi Hsu, Mark W. Cheng, and Ilkka Niva, Evolution Towards Simultaneous High-Speed Packet Data and Voice Services: An Overview of cdma2000 1xEV-DV, 2003 IEEE, pp. 1313-1317.

(Continued)

*Primary Examiner* — Marcos Batista
(74) *Attorney, Agent, or Firm* — Fletcher Yoder PC

(57) ABSTRACT

In a 3G cellular network, a Reverse Link Channel Quality Indicator Channel (R-CQICH) may be transmitted on a reverse link to support forward link high-speed data transmissions. Accordingly, the R-CQICH may be utilized to track the quality of the signal path between the wireless unit and the base station. The base station may include a CQI component that utilizes a received Channel Quality Indicator (CQI) signal from the wireless unit to generate CQI quality metrics based on the quality of the received signal. Also, the CQI quality metrics may be compared to different thresholds to adjust various system configurations in the base station. The base station may also provide feedback to the wireless unit with the updated system configurations. This technique allows CQI quality metrics to be utilized to adjust system configurations dynamically and enhance the operation of a wireless system.

18 Claims, 7 Drawing Sheets

(56) References Cited

OTHER PUBLICATIONS

Anthony C.K. Soong, Seong-Jun Oh, Aleksander D. Damnjanovic, and Young C. Yoon, Forward High-Speed Wireless Packet Data Service in IS-2000—1xEV-DV, IEEE Communications Magazine, Aug. 2003, pp. 170-177.

Medium Access Control (MAC) Standard for cdma2000 Spread Spectrum Systems, Release C, 3GPP2 C.S0003-C, Version 1.0, May 28, 2002.

* cited by examiner

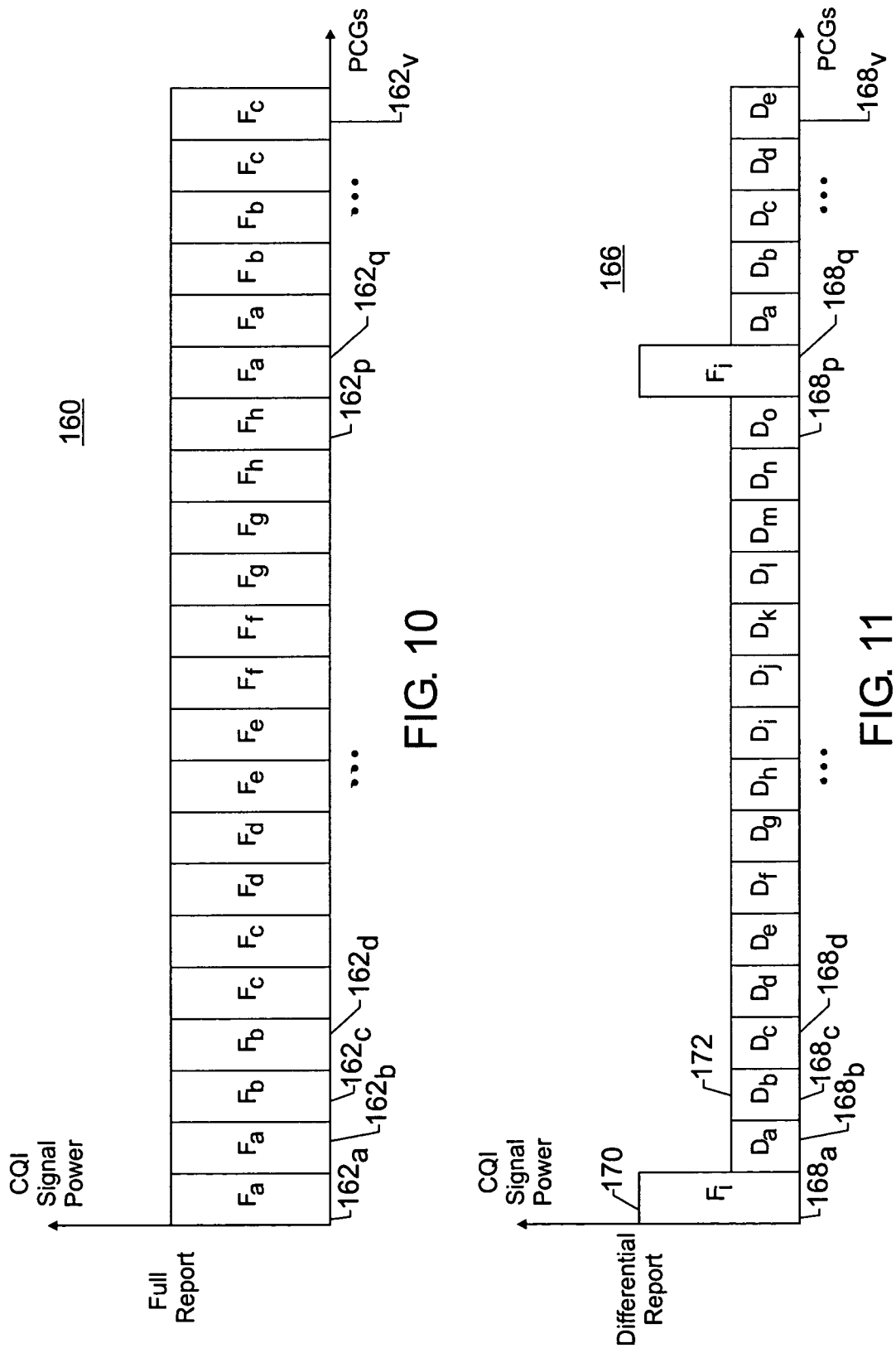

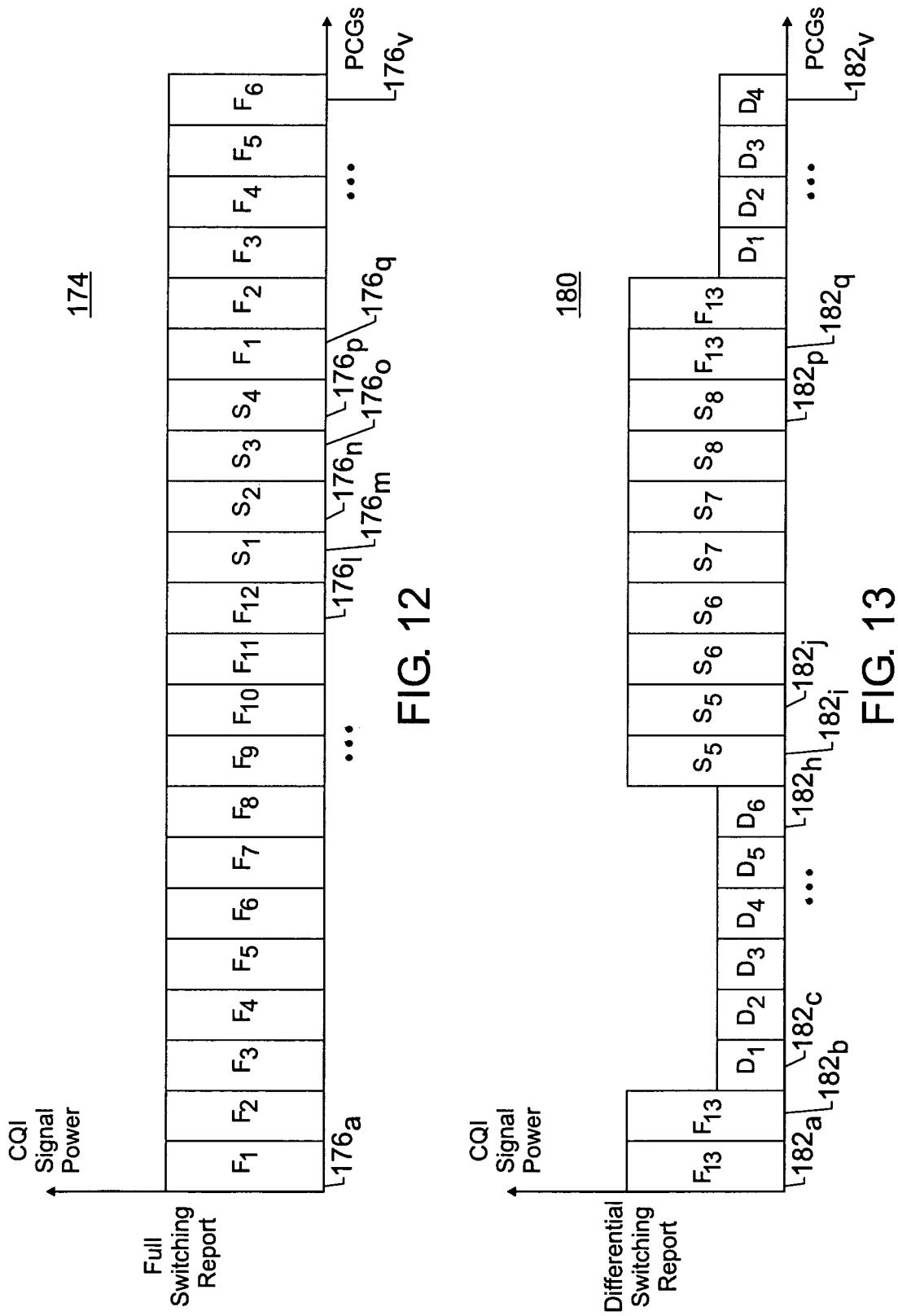

UTILIZATION OF OVERHEAD CHANNEL QUALITY METRICS IN A CELLULAR NETWORK

BACKGROUND OF THE INVENTION

1. Field of the Invention

The present invention relates generally to wireless communication systems and, more particularly, to baseband signal processing and resource management.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In $3^{rd}$ generation or "3G" standards associated with support for high-speed data transmissions, overhead channels are provided to carry control and quality information. The quality and control information includes a link quality indication, decoding acknowledgement and rate control commands. Specifically, in CDMA2000 standard revision C/D, which is hereby incorporated by reference, a Reverse Link (RL) overhead channel, which is a Reverse Channel Quality Indication Channel (R-CQICH), is utilized to support the high speed Forward Link Packet Data Channel (F-PDCH). The R-CQICH carries information for the Forward Link high rate packet data scheduling and cell switching.

When high-speed data service is provided, a wireless unit continuously transmits Channel Quality Indicator (CQI) reports to the base station. The CQI reports are measurements of the Forward Link (FL) pilot energy at the wireless unit. The CQI report is updated each Power Control Group (PCG), which is a time interval of 1.25 ms. A CQI frame contains 16 PCG time slots and lasts 20 ms.

Further, the 3GPP2 standard provides various configurations for CQICH that may be adjusted in the base station and wireless unit. In the Third Generation Partnership Project 2 (3GPP2) standard, two types of CQI reports are allowed, which are a full report and a differential report. The full report is a 4-bit CQI word that represents the sample of the pilot signal during the current PCG. The differential report is a one bit indicator that represents the change of the current CQI from the previous CQI. The full report utilizes more signal power than the differential report, which is one bit indicator. Accordingly, the 3GPP2 standard specifies that the R-CQICH may be configured to operate in a full mode and/or differential mode. In the full mode, all the PCG slots in a CQI frame carry the full reports. In the differential mode, the full reports are generated at the beginning of a CQI frame and followed by the differential bits. Also, a repetition factor may be set for the R-CQICH to adjust the number of times that a full report is retransmitted in both full and differential mode, which may be 1, 2 or 4, for example. At the beginning of a CQI frame in the differential mode, the number of full reports applied is determined by the repetition factor. Similarly, the number of switching slots may be adjusted to provide a cell switch indication pattern, as well. Thus, each of the system or CQI channel configurations may impact the power consumed to provide the CQI signal and provide different adjustments to improve signal quality.

For example, as is shown in FIGS. 10 and 11, exemplary diagrams are provided that illustrate the relationship of the CQI signal power verses different PCGs. In FIG. 10, a Full CQI Report diagram, which may be referred to by reference numeral 160, depicts the CQI signal power for each of the full reports $F_a$-$F_g$ over the different PCGs $162_a$-$162_y$. In this diagram 160, the system configurations for the R-CQICH may include the mode being set to full mode and the repetition factor being set to 2. Accordingly, for the PCGs $162_a$ and $162_b$, the same full report $F_a$ is issued for each of the PCGs. To reduce the power allocated to the R-CQICH, the system configurations may be adjusted to the mode being in the differential mode and the repetition factor being adjusted to 1, as shown in FIG. 11. In FIG. 11, a Differential Report diagram, which may referred to by reference numeral 166, depicts the CQI signal power for the full report $F_i$ and each of the differential reports $D_a$-$D_o$ over the PCGs $168_a$-$168_y$. In this diagram 166, the system configurations for the R-CQICH may include the mode being set to differential mode and the repetition factor being set to 1. Accordingly, in the first PCG $168_a$, the full report $F_i$ may be provided at the indicated CQI signal power level 170, while the differential reports $D_a$-$D_o$ in the subsequent PCGs $168_b$-$168_p$ may be provided at the indicated CQI signal power level 172. Thus, the system configurations impact the CQI signal power.

Similarly, in FIGS. 12 and 13, exemplary diagrams of the switching slots illustrate the power of the CQI signal verses the PCGs. In FIG. 12, the Full Switching Report diagram, which may referred to by reference numeral 174, depicts the CQI signal power for each full report $F_1$-$F_{12}$ for each of the PCGs $176_a$-$176_y$. In this diagram 174, the system configurations for the R-CQICH may be set to full mode and the number of switching slots may be set to 4. Accordingly, the full reports $F_1$-$F_{12}$ are provided over PCGs $176_a$-$176_l$, for the PCGs $176_m$-$176_p$, the switching slots $S_1$-$S_4$ may be allocated to carry the cell switch indication pattern. If the repetition factor is increased to 2, then the number of switching slots utilized to repeat the switching slot information may be increased, while the mode may be set to differential mode to reduce the CQI signal power, as shown in FIG. 13. In FIG. 13, a Differential Switching Report diagram, which may referred to by reference numeral 180, depicts a CQI signal power for each full report $F_{13}$, the differential reports $D_1$-$D_6$, and the switching slots $S_5$-$S_7$. Accordingly, with the repetition factor set to 2, the switching slots $S_5$-$S_7$ may utilize PCGs $182_i$-$182_p$. With the mode being set to differential mode, the CQI signal power may be conserved during the PCGs $182_c$-$182_h$, when the differential reports $D_1$-$D_6$ are provided. Thus, the system configurations influence the CQI signal power.

However, the 3GPP2 standard does not address how to determine the optimized CQI configurations based on different system deployment scenarios. Specifically, the 3GPP2 standard does not provide a mechanism for determining how to dynamically adjust the CQI system or CQI channel configurations based on different system deployment scenarios.

SUMMARY OF THE INVENTION

Embodiments of the present invention may relate to the design of efficient method at base stations that maintain the quality of the signals communicated with wireless units. The specific exemplary embodiments described herein relate to code division multiple access (CDMA). Those of ordinary skill in the art, however, will appreciate that embodiments of the present invention may relate to other types of communication systems, such as Universal Mobile Telecommunications Systems (UMTS). A brief description of the use of channel quality indicator (CQI) in CDMA systems in utilizing 3GPP2 standards is provided herein by way of example.

Generally, in a wireless system supporting data services, data and control channels carry burst type of traffic. These channels are not suitable to be used for tracking link quality for system usage because continuously monitoring of channel condition is desired. However, as noted above, continuous overhead channels may be utilized to provide the link quality information in a timely and constant manner. As a result, the monitoring of continuous overhead channels is utilized for quality protection and resource allocation to ensure the quality of services and improve the system capacity.

In the CDMA2000 Standard revision C/D, as noted above, the overhead channel, such as R-CQICH, is utilized to support the Forward Link Packet Data Channel (F-PDCH). The R-CQICH, which continuously operates as long as the FL high rate data services are requested by the wireless unit, carries information for the Forward Link high rate packet data scheduling and cell switching. As a result, it may be utilized to provide RL quality metrics for system applications, such as power control, cell switch, scheduling and quality control of R-CQICH itself.

Because R-CQICH carries information for scheduling and cell switch, the quality of the R-CQICH may impact the overall system throughput and cell switch performance. Accordingly, increased transmission power may be allocated to R-CQICH to maintain the quality of this channel. However, because the R-CQICH is a continuous channel, it may consume power comparable with other reverse link channels or even higher depending on the reporting mode of R-CQICH. Accordingly, it may be advantageous to reduce the power consumed by the R-CQICH to improve the overall system capacity.

To measure the system performance, erasures may be utilized as a frame quality indication. That is, the number of erasures per frame may be utilized to monitor the R-CQICH quality. The generation of erasures involves hard decisions that cause a certain degree of information loss. These erasures are provided for full mode, but not for differential mode. Yet, the R-CQICH is utilized in full and differential mode with the differential mode being utilized to reduce power consumption. As a result, if the frame quality indication is based on the number of erasures from the full report, no enough erasure information may be obtained in a frame in differential mode. Accordingly, it may be advantageous to generate frame based CQI channel quality metrics for differential reports in addition to the full reports. Further, for both full and differential reports, soft decision metrics are desired rather than the number of erasures, to provide improved information about the quality of R-CQICH.

Further, the consistent frame quality metrics for both full and differential reports may be utilized to generate long-term CQI frame quality metrics, which may be referred to as long-term quality metrics. The long-term quality metrics are generated by filtering the frame based quality metrics over multiple frames.

Accordingly, under the present techniques, metrics may be provided for full and differential modes to maintain the quality of the R-CQICH. These metrics may be utilized to dynamically adjust system or CQI channel configurations and power settings. That is, the channel configurations, such as switching between differential and full modes, adjusting the repetition factor, and/or adjusting the number of switching slots, may be adjusted based on different system scenarios and channel conditions that are indicated by the metrics. Also, the frame quality metrics may be utilized to determine whether to continue or stop scheduling high-speed data transmission on F-PDCH based on the reliability of the CQI. Similarly, an Outer Loop Power Control (OLPC) may be adjusted based on short-term CQI frame quality metrics to adjust the power of CQI transmissions. The updated CQI channel or system configurations may affect both the base station and the wireless unit. That is, the system configurations may be applied to the base station locally and may be transmitted to the wireless unit via the signaling.

In accordance with one aspect of the present invention, a mechanism in a base station that manages the quality of a wireless signal path is provided. As set forth by way of example, the base station is configured to decode a received signal into decoded signals. From these decoded signals, the base station may generate quality metrics that are associated with a channel quality indicator (CQI) for a transmitted signal. Then, the base station compares the quality metrics to frame quality settings or thresholds to determine whether to adjust one or more system configurations based on the comparison.

BRIEF DESCRIPTION OF THE DRAWINGS

Advantages of the invention may become apparent upon reading the following detailed description and upon reference to the drawings in which:

FIGS. 10-13 illustrate diagrams depicting exemplary system configurations in a base station and wireless unit.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The techniques disclosed herein may provide an improved approach for monitoring the quality of the signal paths between the base station and wireless units. Specifically, the techniques described herein relate to a Channel Quality Indicator (CQI), and adjusting system configurations dynamically based on the metrics associated with the quality of the CQI. Under the present technique, a base station may include a CQI recovery/decoding unit, CQI metric generation unit, and a decision making unit that are utilized to process frame quality metrics to determine whether to dynamically adjust various system configurations. Specifically, the CQI components may generate soft decision metrics, such as short-term quality metrics and long-term quality metrics, utilized to change the system configurations for the channels communicating between the wireless unit and the base station. The sequence of soft decision metrics, which may be utilized for both CQI full and differential reports, represent the CQI quality, and their accumulations reflect long-term CQI performance. The CQI frame quality soft decision metrics may be utilized to track the CQI performance for R-OLPC, and the long-term quality metrics may be used to modify the repetition factor, and to allocate cell switch slots. Thus, the proposed techniques provide a method and apparatus for improving the wireless system's performance.

Figure 1:
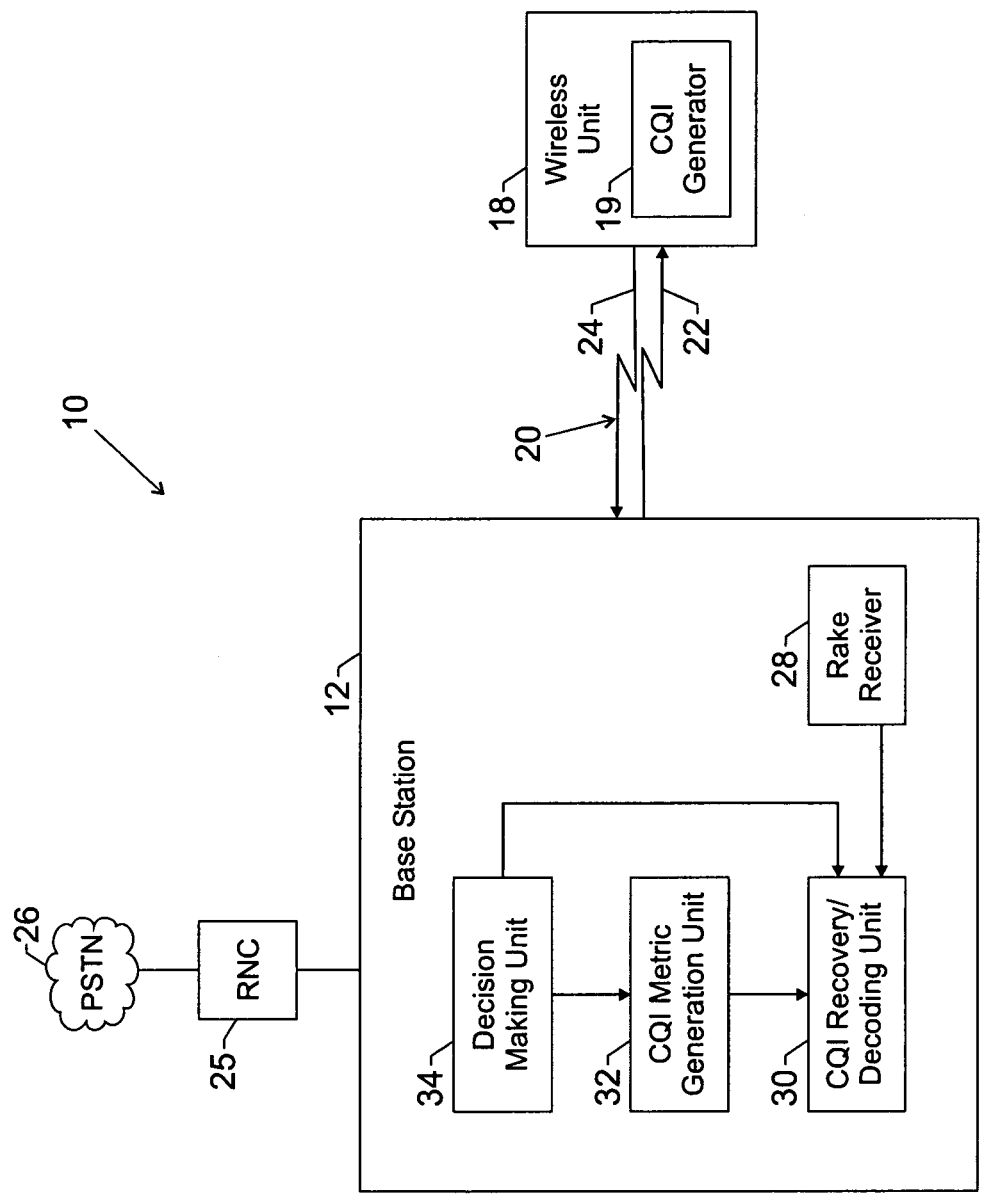
FIG. 1 illustrates an exemplary embodiment of a wireless communications system having a base station and wireless unit.

Turning now to the drawings, and referring initially to FIG. 1, an exemplary wireless communications system that incorporates a base station and wireless units is illustrated and generally referred to by reference numeral 10. In the exemplary embodiment of FIG. 1, the base station 12 includes various components, such as a CQI recovery/decoding unit 30 and a CQI metric generation unit 32 to provide CQI metrics to a decision making unit 34. Based on the metrics, the decision making unit 34 may compare the metrics with different settings and thresholds to adjust the system configurations, as discussed below.

Before discussing the generation of metrics in the base station 12, it may be useful to discuss the wireless communications system 10 and the wireless unit 18. To begin, in any given cellular area, a cellular network, such as the wireless communications system 10, may include one or more base stations 12. For example, the wireless communications system 10 may be a Third Generation Partnership Project 2 (3GPP2) CDMA2000 1× system, a 1× evolution data and voice (EVDV) system, a 1× evolution data optimized (EVDO) system, or a universal mobile telecommunications system (UMTS). Through the base station 12 different data services may be provided to one or more wireless units, which are represented by wireless unit 18. Further, the base station 12 is typically coupled to the PSTN 26 through Radio Network Controller (RNC) 25. The RNC 25 may manage functions in multiple base stations.

As calls take place within the wireless communications system 10, the wireless unit 18 communicates with the base station 12. Communications between the wireless unit 18 and the base station 12 occurs primarily via the RF communications over the intervening air interface between the antennas of the respective wireless unit 18 and base station 12. Each communication signal path 20 typically comprises a forward link 22 and a reverse link 24. The forward channels or links 22 are portions of the signal paths 20 from the base station 12 to the wireless units 18. If the system utilizes CDMA, the forward links 22 may include one or more code channels that are transmitted on top of the pilot channel to the wireless units 18. The reverse links 24 are portions of the signal paths 20 from the wireless units 18 to the base station 12. If the system utilizes CDMA, the reverse links 24 may also include one or more code channels. Through the use of these forward links 22 and reverse portions 24, the base station 12 and the wireless unit 18 are able to communicate with each other.

The practical limit on the number of wireless units 18 that a wireless communications system 10, such as a CDMA system, can support is based on the amount of interference or noise present on the wireless communications system 10. Specifically, as the noise increases, the system capacity decreases. Because wireless units 18, such as mobile phones, transmit on the same frequency, decoding a single signal from a wireless unit 18 includes distinguishing that particular signal from received signals. In other words, non-desired signals are simply noise with respect to the desired signal. Therefore, distinguishing between desired and non-desired signals becomes increasingly difficult as more wireless units 18 are added to the wireless communications system 10 because the noise increases. Maintaining the low transmission power for the wireless units 18 may reduce the amount of interference caused by transmissions. Conversely, the transmission power of each of the wireless units 18 has to be maintained at a level that the base station 12 can demodulate/decode the signal without error. That is, the wireless units 18 transmission power may be managed to achieve a desired signal-to-noise-ratio (SNR).

To manage the quality of a signal received, the wireless unit 18 may include a CQI generator 19 that may be utilized to determine CQI quality level of the signal received on the forward link 22 from the base station 12. The CQI quality level may be determined by calculating the $E_c/N_t$ signal-to-noise ratio (SNR) of the pilot signal received by the wireless unit 18 and converting the calculated value into a CQI quality level. By way of example, the CQI generator 19 may include a Hadamard encoder, puncturer, modulator, and mulitplexer, signal flipper, along with other circuitry or the like, for example. The wireless unit 18 may provide the CQI to the base station 12 via the R-CQICH over the reverse link 24.

The base station 12 may receive the transmitted signal from the wireless unit to process the CQI. Specifically, the base station 12 may include components, such as a rake receiver 28, a CQI recovery/decoding unit 30, a CQI metric generation unit 32, and/or a decision making unit 34 to process the CQI signals. The rake receiver 28 may despread, demodulate and provide CQI information about the received baseband signal to the CQI recovery/decoding unit 30 in a demodulated signal.

With the demodulated signal, the CQI recovery/decoding unit 30 and the CQI metric generation unit 32 may generate and provide metrics that relate to the CQI and quality of the R-CQICH. Specifically, the CQI recovery/decoding unit 30 may receive signals from the wireless unit 18 and decode the demodulated signals through generating and comparing the CQI decoding/decision metrics. The CQI decoding/decision metrics, which may be referenced individually as decoding metrics or decision metrics, represent the CQI quality levels for full or differential reports respectively. The decoding and decision metrics are then provided to the CQI metric generation unit 32. The CQI metric generation unit 32 may further process the metrics and associated signals to provide metrics to the decision making unit 34. The metrics may include short-term quality metrics and long-term quality metrics for both full and differential modes.

The decision making unit 34 may analyze the received metrics against various settings or thresholds to determine whether to adjust various system configurations. The thresholds may include switching slot thresholds, frame quality thresholds, repetition thresholds, and/or long-term quality threshold. By comparing the metrics to the thresholds, the decision making unit 34 may determine when to adjust the system configurations to account for changes in the CQI. The system configurations in the 3GPP2 standard may include settings, such as full and/or differential mode, a repetition factor, number of switching slots, number of switching frames, Out Loop Power Control (OLPC) settings, and/or scheduling states. Then, the adjusted configuration parameters are determined, the new settings may be send to the wireless unit 18 via a FL signal channel to update the R-CQICH configuration in the wireless unit 18. The same configuration may also be sent to the local CQI recover/decoding unit 30 to ensure the receiving process matches with the transmissions of wireless unit 18. As a result, the decision making unit 34 may provide a closed loop approach that dynamically updates system configurations in the base station 12 and wireless unit 18 to improve the overall system performance.

Based on the CQI frame quality metrics discussed above, a frame on the reverse link 24 may be declared to be of low quality based on various thresholds, such as the frame quality threshold. Declaring a low quality frame may generate a CQI bad frame event, which is similar to generating an error event by cyclical redundancy check (CRC) for FCH. The CQI frame error event may be used by the power control mechanism in base station 12 to adjust transmission power of the wireless unit 18 via outer loop and inner loop power control. Similarly, the decision making unit 34 may utilize CQI long-term quality metrics to track the CQICH performance and employ the associated thresholds against the metrics to adjust the CQICH configurations. Each of FIGS. 2-7 illustrates the use of the CQI frame quality metrics, such as short-term quality metrics and long-term quality metrics, in an exemplary embodiment of the base station of FIG. 1 in accordance with aspects of the present technique. Accordingly, each of the FIGS. 2-7 may be best understood in conjunction with FIG. 1.

Figure 2:
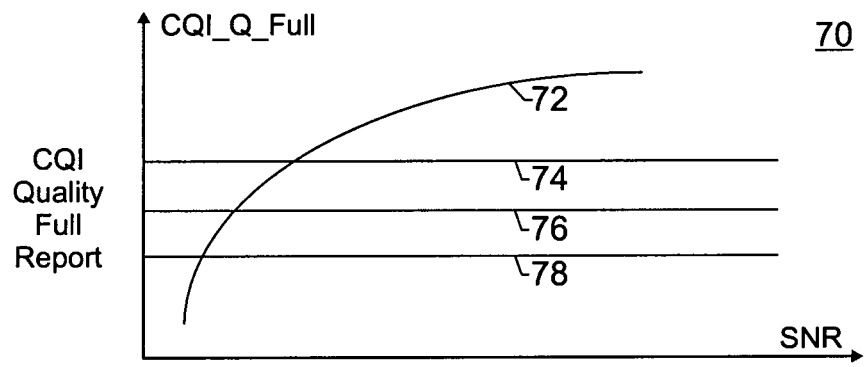
FIGS. 2-7 illustrate diagrams depicting the use of the CQI frame quality metrics in an exemplary embodiment of the base station in FIG. 1 in accordance with aspects of the present technique.

FIG. 2 illustrates an exemplary diagram of the strength of the CQI frame quality metrics for full report in full mode verses the frame quality thresholds utilized in the base station of FIG. 1. The CQI Quality Full Report diagram, which may be referred to by reference numeral 70, depicts the CQI frame quality metric for a full report CQI_Q_Full verses the SNR of the signal received by the base station 12 from the wireless unit 18. In the diagram 70, the strength of the CQI frame quality metric may be represented by a curve 72, while lines 74, 76 and 78 may represent different frame quality thresholds. The frame quality thresholds 74, 76 and 78 are differentiated based upon the repetition factors utilized for full report CQI transmission from the wireless unit 18. Beneficially, the CQI frame quality metric for full mode may be used to provide accurate quality information than the number of erasures, which are utilized by the R-OLPC.

In the diagram 70, a CQI bad event, such as a "bad quality" event, is generated when the CQI frame quality metric 72 is below the one of the frame quality thresholds 74, 76 and 78 in different repetition cases. The CQI bad event may be generated by the decision making unit 34. Based on the CQI bad event, the R-OLPC set point may be increased for unfavorable CQI performance. Thus, the increase in the R-OLPC set point results in an increase of the average transmission power for the wireless unit 18 via reverse inner loop power control (R-ILPC).

Figure 3:
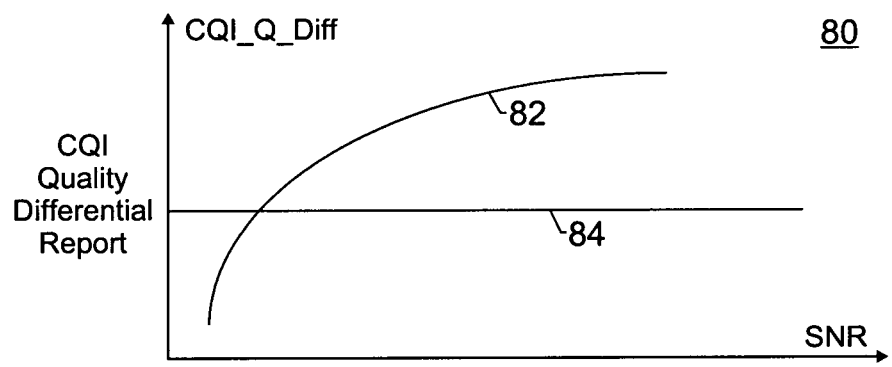

FIG. 3 illustrates an exemplary diagram of the strength of the CQI frame quality metrics for differential report in differential mode verses a frame quality threshold for differential reports utilized in the base station 12. The CQI Quality Differential Report diagram, which may be referred to by reference numeral 80, depicts the CQI frame quality metric for a differential report CQI_Q_Diff verses the SNR of the signal received by the base station 12 from the wireless unit 18. In the diagram 80, the strength of the CQI frame quality metric may be represented by a curve 82, while the frame quality threshold may be represented by a line 84. Because the differential reports are not affected by the repetition factors, a single frame quality threshold 84 is utilized to determine when the system configurations may be adjusted, similar to the discussion of FIG. 2.

Figure 4:
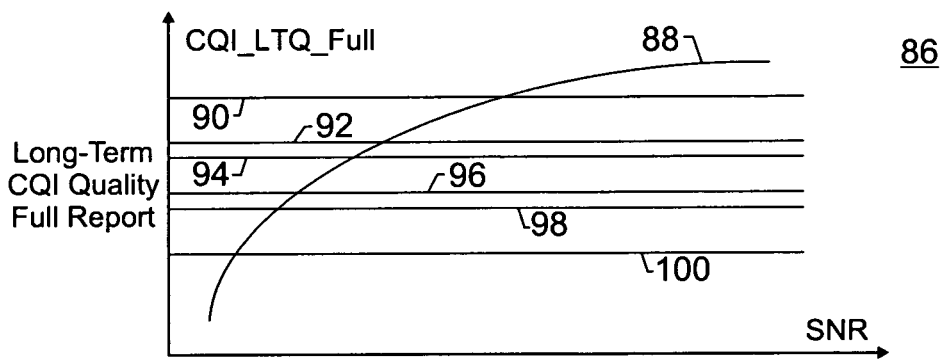

FIG. 4 illustrates an exemplary diagram of the strength of the long-term CQI frame quality metrics in full mode verses the repetition thresholds utilized in the base station of FIG. 1. The Long-Term CQI Quality Full Report diagram, which may be referred to by reference numeral 86, depicts the long-term CQI frame quality metric for a full report CQI_LTQ_Full verses the SNR of the signal received by the base station 12 from the wireless unit 18. In the diagram 86, the strength of the long-term CQI frame quality metric may be represented by a curve 88, while lines 92, 94, 96 and 98 may represent different repetition thresholds. The different repetition thresholds 92, 94, 96 and 98 are differentiated based upon the repetition factors currently utilized for communicating with the wireless unit 18.

In the diagram 86, the repetition factor may be determined by comparing the thresholds 92, 94, 96 and 98 against the long-term CQI frame quality metric 88. For example, if the current repetition factor is "1," and the value of the long-term CQI frame quality metric 88 may be smaller than the repetition threshold 94, which may represent the threshold for increasing the repetition factor from 1 to 2. Then the repetition factor may be increased because the CQI quality is decreasing, which results in the repetition factor being increased from 1 to 2. Likewise, if the current repetition factor is "2," and the value of the long-term CQI frame quality metric 88 may be greater than the repetition threshold 92, which may represent the threshold for decreasing the repetition factor from 2 to 1. Because the CQI quality is increasing, the repetition factor may be decreased from 2 to 1. Thus, the long-term CQI frame quality metric may be utilized along with the thresholds 92, 94, 96 and 98 to adjust the repetition factor.

Further, the long-term CQI frame quality metric 88 may be utilized with the thresholds 90 and 100 to adjust for extreme conditions that may occur on the channel. For instance, when the channel condition is good and current operation mode of R-CQICH is in the full mode, the long-term CQI frame quality metric 88 may exceed the threshold 90, which indicates that the CQI reports may be switched to differential mode, not in full mode. As noted above, the switch to differential mode reduces the power consumption of the CQI reports. Similarly, when the channel condition is bad, the long-term CQI frame quality metric 88 may be below the threshold 100, which indicates that the quality of CQI reports may be too bad. Below the threshold 100, no high rate data scheduling may be permitted because the CQI reports are not reliable. As such, the long-term CQI frame quality metric 88 may be utilized along with the thresholds 90 and 100 improve the efficiency of the CQI reporting.

Figure 5:
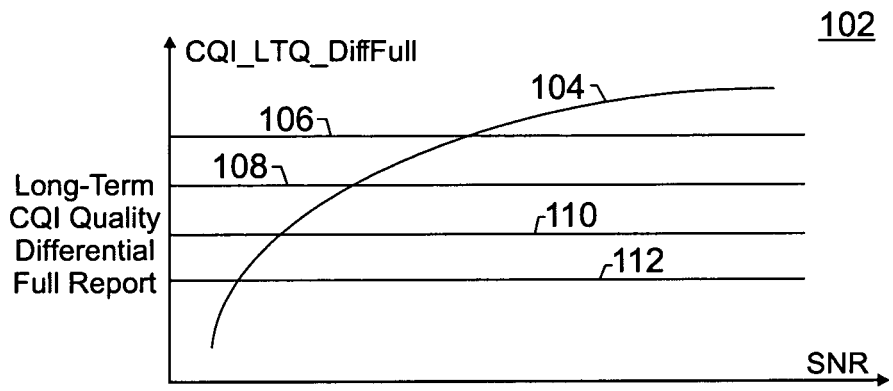

FIG. 5 illustrates an exemplary diagram of the strength of the long-term CQI frame quality metrics in differential mode verses the repetition thresholds utilized in the base station of FIG. 1. In differential mode, the initial full report metrics may be used to determine the differential mode full report repetition factor. The Long-term CQI Quality Differential (mode) Full Report diagram, which may be referred to by reference numeral 102, depicts the long-term CQI frame quality metric for the initial full reports, CQI_LTQ_DiffFull verses the SNR of the signal received by the base station 12 from the wireless unit 18. In the diagram 102, the strength of the long-term CQI frame quality metric may be represented by a curve 104, while lines 106, 108, 110 and 112 may represent different repetition thresholds. The different repetition thresholds 106, 108, 110 and 112 are differentiated based upon the repetition factors utilized for communicating with the wireless unit 18. Similar to the discussion of diagram 86 in FIG. 4, the repetition factor may be determined by comparing the thresholds 106, 108, 110 and 112 against the long-term CQI frame quality metric 104.

Accordingly, the operation of the long-term CQI frame quality metric with the thresholds 106, 108, 110 and 112 is similar to diagram 86. For example, if the current repetition factor is "1," then the value of the long-term CQI frame quality metric 104 may be smaller than repetition threshold 108, which may represent the threshold for increasing the repetition factor from 1 to 2. As a result, the repetition factor is increased from 1 to 2. Thus, the long-term CQI frame quality metric 104 may be utilized along with the thresholds 106, 108, 110 and 112 to adjust the repetition factor in differential mode.

Figure 6:
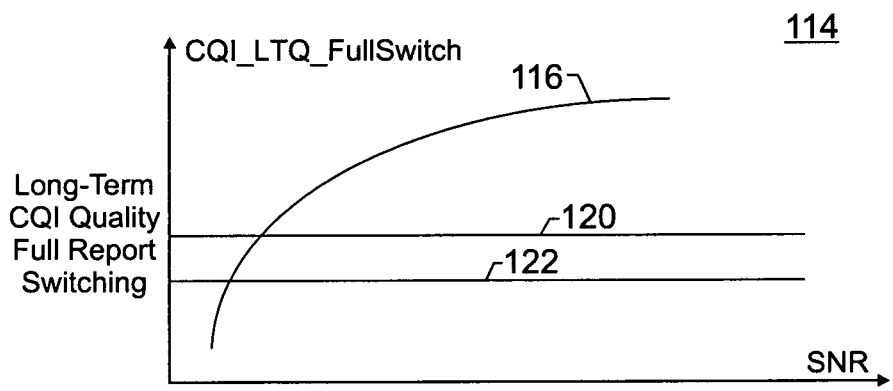

FIG. 6 illustrates an exemplary diagram of the strength of the long-term CQI frame quality metrics in full mode verses the switching slot thresholds utilized in the base station of FIG. 1. The Long-term CQI Quality Full Report Switching diagram, which may be referred to by reference numeral 114, depicts the long-term CQI frame quality metric for a full report CQI_LTQ_FullSwitch verses the SNR of the signal received by the base station 12 from the wireless unit 18. In the diagram 114, the strength of the long-term CQI frame quality metric may be represented by a curve 116, while lines 120 and 122 may represent different switching slot thresholds. The switching slot thresholds 120 and 122 are differentiated based upon the cell switching slots provided to the reverse link 24 for the wireless unit 18. Beneficially, the long-term CQI frame quality metric for full mode may be used to adjust the switching slots allocated to the wireless unit 18.

In the diagram 114, the allocated cell switching slots may be determined by comparing the switching slot thresholds 120 and 122 against the long-term CQI frame quality metric 116. For example, the current system configuration or parameter on the number of switching slots is "2" for a wireless unit 18. If the value of the long-term CQI frame quality metric 116 is smaller than the switching slot threshold 120, which may represent the threshold for increasing the number of allocated switching slots from 2 to 4. The number of switch slots is increased from 2 to 4 because the CQI quality is decreasing. When the long-term CQI frame quality metric 116 is above the threshold 120 or 122, it may be desirable to not reduce the number of switch slots for simplicity and to maintain the quality of service. Thus, the long-term CQI frame quality metric may be utilized along with the thresholds 120 and 122 to adjust the switching slots.

Figure 7:
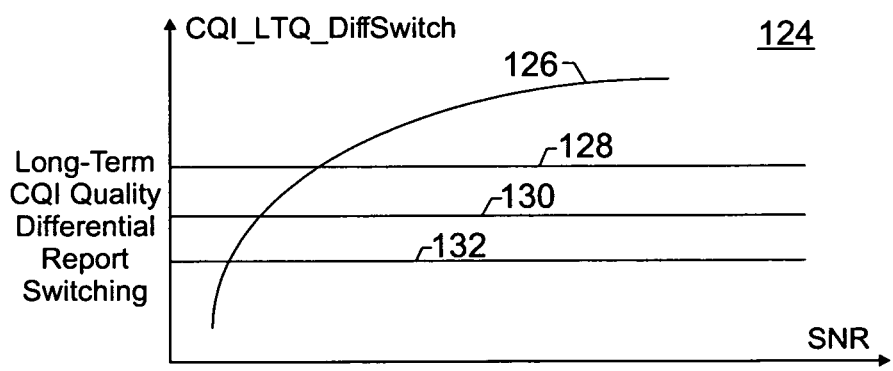

Similar to the full mode discussed above, the long-term quality metrics for differential report may be used to determine the number of switching slots in the differential mode, as shown in FIG. 7. FIG. 7 illustrates an exemplary diagram of the strength of the long-term CQI frame quality metrics in differential mode verses the switching slot thresholds utilized in the base station of FIG. 1. The Long-term CQI Quality Differential Report Switching diagram, which may be referred to by reference numeral 124, depicts the long-term CQI frame quality metric for a differential report CQI_LTQ_DiffSwitch verses the SNR of the signal received by the base station 12 from the wireless unit 18. In the diagram 124, the strength of the long-term CQI frame quality metric, which may be referred to as long-term quality metrics, may be represented by a curve 126, while lines 128 and 130 may represent different thresholds to determine the number of switching slots. The different switching slot thresholds 128 and 130 are differentiated based upon the number of slots allocated to the wireless unit 18. Similar to the discussion of diagram 114 in FIG. 6, the allocated switching slots may be determined by comparing the thresholds 128 and 130 against the long-term CQI frame quality metric 124. In contrast to the full mode, if the differential long-term quality metric 126 is below the threshold 132, the CQI reporting mode may be switched from the differential mode to the full mode to ensure the performance of the CQI recovery and decoding. The generation of CQI metrics by the CQI unit 36 is explained in greater detail below in FIG. 8.

Figure 8:
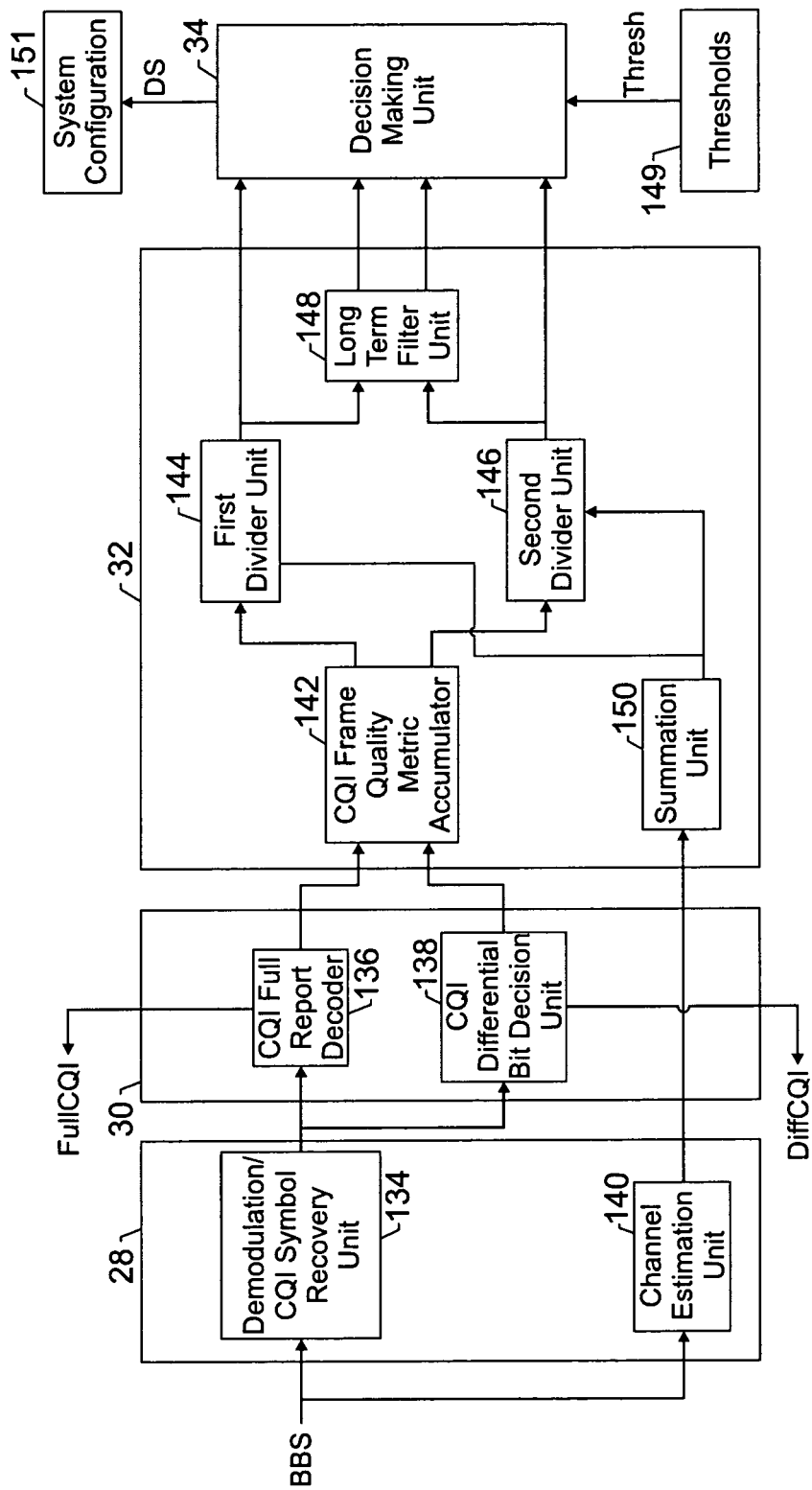
FIG. 8 illustrates a functional block diagram of exemplary CQI components in the base station of FIG. 1.

In FIG. 8, a functional block diagram of exemplary CQI components in the base station of FIG. 1 is shown. In this embodiment, the rake receiver 28 receives a base band signal BBS from one of the wireless units 18. The CQI components evaluate the CQI received on the R-CQICH and calculate the appropriate CQI frame quality metrics. Then, the decision making unit 34 determines and optimizes the configurations and parameters to improve the system performance. The thresholds, which are pre-determined, are employed by the decision making unit 34 to maintain the quality of the CQICH.

As noted above, the rake receiver 28 may include various components to demodulate the signals received from the wireless unit 18. For instance, the rake receiver 28 may include a demodulation/CQI symbol recovery unit 134 and a channel estimation unit 140. The demodulation/CQI symbol recovery unit 134 may be utilized to receive the baseband signal (BBS) from the wireless unit 18. The rake receiver/CQI symbol recovery unit 134 may function to despread, demodulate and combine the received signal BBS.

Further, a channel estimation unit 140 may also be utilized in the rake receiver 28 to evaluate the phase shift of the baseband signal BBS. The phase shift removal process may introduce some bias at the signal level. Accordingly, a compensation factor is calculated in the channel estimation unit 140 and is then provided to the CQI metric generation unit 32.

As noted above, the CQI components may include the CQI recovery/decoding unit 30 that includes various components to process the information in the demodulated signals provided from the demodulation/CQI symbol recovery unit 134. For instance, the CQI recovery/decoding unit 30 may include a CQI full report decoder 136 and a CQI differential bit decision unit 138. The CQI full report decoder 136 may utilize the demodulated soft symbols to further perform decoding. The CQI full report decoder 136 may decode the demodulated soft symbols into one of sixteen different values in a lookup table. The decoding metrics are calculated from the soft symbols. The decoding metrics, which may include about 16 estimated values for CQI words that correspond to 16 corresponding decoding metrics, are then sorted to form a list or table of values. The CQI word corresponding to the maximum decoding metric is the decoded word, which is transmitted from the wireless unit 18. The maximum decoding metric is send to the CQI frame quality metrics accumulator 142. In addition, the CQI full report decoder 136 may provide a full report via a signal FullCQI to the other components, such as a scheduler (not shown) to adjust the power utilized for the forward link 22.

Similarly, the CQI differential bit decision unit 138 also may utilize the demodulated signals to further process the quality information provided from the demodulation/CQI symbol recovery unit 134 for CQI differential reports. Because the differential report is a single bit, the bit can be obtained by making a hard decision on the demodulated signal (soft symbol). In fact, the demodulated signal serves as the differential bit decision metric. In the event an erasure is indicated as a CQI quality metric for differential reports, the CQI differential bit decision unit 138 may conduct the three state decision process, which is discussed below in FIG. 9. For generating the soft decision metrics, the CQI differential bit decision unit 138 may provide a differential decision metric signal Diff_Decision_Metric to the CQI metric generation unit 32 and may provide differential reports via a signal DiffCQI to the scheduler (not shown) to allocate resources for the forward link 22.

The CQI metric generation unit 32 may also include various components to generate metrics from the signals provided from the CQI recovery/decoding unit 30. For instance, the CQI metric generation unit 32 may include a CQI frame quality metric accumulator 142, a first divider unit 144, a second divider unit 146, a long-term filter unit 148, and a channel estimation summation unit 150. The CQI frame quality metric accumulator 142 may accumulate the decoding metric signal Max_Decode from the CQI full report decoder 136 and the differential decision metric signal Diff_Decision_Metric from the CQI differential bit decision unit 138. The signals may then be provided to a first divider unit 144 and a second divider unit 146.

The first and second divider units 144 and 146 may receive signals from the CQI frame quality metric accumulator 142 and the summation unit 150. The signal from the summation unit 150 may be a channel estimation scaling factor, while the CQI frame quality metric accumulator 142 may be specific to the differential or full mode. For instance, the first divider unit 144 may receive signals that relate to CQI frame quality metrics for the full mode, while the second divider unit 146 may receive signals that relate to the CQI frame quality metrics for the differential mode. Regardless of the source, the first and second divider units 144 and 146 provide the resulting signals from each unit to the long-term filter 148 and the decision making unit 34. Specifically, the first divider unit 144 provides a signal CQI_Quality_Full to the decision making unit 34, while the second divider unit 146 provides a signal CQI_Quality_Diff to the decision making unit 34.

In the long-term filter unit 148, the signals from the first and second divider units 144 and 146 may be processed to create signals that include CQI information from a specific interval of time. From the first divider unit 144, a signal CQI_Quality_Full_LT is created that is associated with the long-term metrics for the full mode. Similarly, from the second divider unit 146, a signal CQI_Quality_Diff_LT is created that is associated with the long-term metrics for the differential mode. The long-term quality metrics are obtained by applying a long-term filter on the frame based CQI frame quality metrics, which may include one or more frames of data. Then, the signals are provided to the decision making unit 34 from the long-term filter unit 148.

The decision making unit 34 may receive these various signals that include CQI frame quality metrics and analyze the CQI frame quality metrics against thresholds 149. The thresholds 149 may be pre-determined values that are represented by a threshold signal Thresh. The thresholds 149 may include predefined or adjustable settings that are stored in memory and utilized as baselines for the communication between the wireless unit 18 and the base station 12. For example, the thresholds 149 may include switching slot thresholds, frame quality thresholds, repetition thresholds, long-term quality threshold and CQI erasure thresholds.

Based on the CQI frame quality metrics and the thresholds 149, the decision making unit 34 may provide a feedback signal to the wireless unit 18 and/or update the system configurations 151, as discussed above. The system configurations 151 may include settings or configurations for the CQICH, such as the full/differential mode indication, the repetition factor, number of switching slots and/or number of switching frames, R-OLPC settings, and/or scheduling states, for example. The system configurations 151 may be stored in memory of the base station 12. These signals that include the systems configurations may be referred to as the decision signals DS. Thus, the decision making unit 34 may determine whether the system configurations should change based on various metrics associated with the CQI of the R-CQICH.

The calculation of CQI frame quality metrics may be generated by the CQI recovery/decoding unit 30 and the CQI metric generation unit 32. In the CQI recovery/decoding unit 30, the calculation of CQI frame quality metrics associated with erasures in the differential and full mode may be utilized to improve the performance of the system. For instance, while erasures are typically generated for the full report, for the differential report erasures may also be generated by performing a three-state decision on CQI differential bit in the CQI recovery/decoding unit 30. The CQI differential bit three-state decision metric at $PCG_i$ is given by the following equation:

Diff_ThreeState_Metric$_i$=Diff_Hard_Decision_Metric$_i$/Chest_Factor$_i$

The differential bit hard decision metric at $PCG_i$ is:

$$\text{Diff\_Hard\_Decision\_Metric}_i = \sum_{j,k} \text{Re}(\hat{C}^*_{jk} r_{jk})$$

if the R-FCH is on, and is:

$$\text{Diff\_Hard\_Decision\_Metric}_i = \sum_{j,k} \text{Im}(\hat{C}^*_{jk} r_{jk})$$

if the R-FCH is off. In these equations, the power control group (PCG) is time interval that may be a 1.25 ms interval on the forward channels 22 and/or a reverse channels 24. Further, r (in complex form) is the received signal before combining the received signals in the rake receiver/CQI symbol recovery unit 134, j is the number of repeated symbols of a differential bit over one PCG, k is the number of fingers being combined. The symbol:

$\hat{C}^*_{jk}$ is the complex conjugate of channel estimation at finger k and symbol j. The Chest_Factor is the scaling factor at $PCG_i$ based on the channel estimation. The chest factor is represented by the equation:

$$\text{Chest\_Factor}_i = \sum_{j,k} |\hat{C}_{jk}|^2$$

Figure 9:
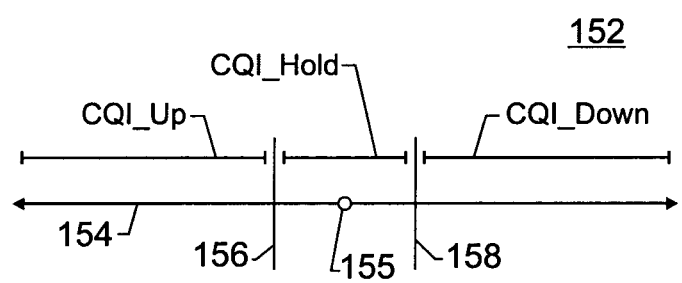
FIG. 9 illustrates an exemplary chart of a differential bit three-state decision metric associated with CQI erasure thresholds utilized in the exemplary CQI components of FIG. 8.

Based on these equations and the differential bit three-state decision metric, three different states may be determined by the CQI differential bit decision unit 138, as shown in FIG. 9.

FIG. 9 is an exemplary chart of the differential bit three-state decision metric Diff_ThreeState_Metric utilized with the associated CQI erasure thresholds 156 and 158 in the exemplary CQI unit of FIG. 9. The differential bit three-state decision metric (Diff_ThreeState_Metric), which is represented by line 154, may be divided into three-states, such as a CQI up state CQI_UP, a CQI down state CQI_Down, or a CQI hold state CQI_Hold. The states are divided based upon the value of the differential bit three-state decision metric 154 in relation to the CQI erasure thresholds 156 and 158. By dividing the differential bit three-state decision metric 154 into three-states, erasures for the differential mode may be determined. Thus, number of erasures over an entire frame may be determined, as discussed above.

To provide the three-states, two CQI erasure thresholds 156 and 158 that are on opposite sides of a predetermined value 155 may intersect the line 154. The predetermined value 155 may be "0" or may be another suitable base value. A CQI up erasure threshold 156 may be utilized to divide the CQI up state CQI_Up from the CQI hold state CQI_Hold. The CQI up state CQI_UP may indicate that the CQI quality is improving, while the CQI hold state CQI_Hold may indicate that an erasure has occurred. Similarly, a CQI down erasure threshold 158 may be utilized to divide the CQI hold state CQI_Hold from the CQI down state CQI_Down.

As an example, the differential bit three-state decision metric 154 may be in one of three basic types of decisions in a given $PCG_i$. For instance, if the differential bit three-state decision metric 154 is less than the value of the CQI down erasure threshold 94, then the differential bit three-state decision is made to the CQI down state CQI_Down. That is, the CQI bit from the wireless unit 18 may be interpreted to as a "0," which indicates that the current CQI value is decreasing. Further, if the differential bit three-state decision metric 154 is greater than the value of the CQI up erasure threshold 156, then the differential bit three-state decision is made to the CQI up state CQI_Up. As a result, the CQI bit from the wireless unit 18 may be interpreted to as a "1," which indicates that the current CQI value is increasing. Finally, if the differential bit three-state decision metric 154 is less than or equal to the CQI up erasure threshold 156 and greater than or equal to the value of the CQI down erasure threshold 158, it is indicate that the quality of the received CQI signal is not good. Then, the differential bit three-state decision is made to the CQI hold state CQI_Hold. If the decision metric was in this region and a two state decision were made, it would be more likely to generate an error. As a result, the CQI bit from the wireless unit 18 may not be interpreted, and an erasure may be declared.

Beneficially, by declaring an erasure, the CQI bit transmitted may be discarded and unreliable information may not be utilized. The erasure indicates that the channel condition on the reverse link 24 is not performing at the appropriate levels. Further, the erasures may be generated for the differential reports over a frame to be utilized as a frame quality metric in differential mode. One of the purposes of the three states decision method is to indicate the CQI signal quality and channel condition. It may be used to generate the erasures only while the CQI differential bits are still determined by the two state decisions.

Another CQI frame quality metric may be the CQI frame quality soft decision metrics. As discussed above, erasures are generated by making hard decisions in the full or differential decoding/decision metrics. The hard decision results in a certain degree of information loss. To avoid the loss of information, the frame based quality metrics may provide more accurate measurement on the signal quality than the number of erasures per frame or multiple frames. As such, the CQI frame quality soft decision metrics may improve the system by providing more accurate information about the reliability of the CQI value.

The CQI frame quality soft decision metrics are generated by the CQI metric generation unit 32, as discussed above. The CQI frame quality soft decision metrics are generated by accumulating the PCG based erasure metrics over a frame. In full mode, the CQI frame quality soft decision metric may be calculated differently over a switching period and a non-switching period. During the non-switching period, which is in normal operation mode and a cell switch is not involved, the CQI frame quality soft decision metric is represented by the equation:

$$CqiQuality\text{ }Full = \sum_{j}^{CQI\_frm} \max_{M}(DecodeMetric_m)_j \Big/ \sum_{i}^{CQI\_frm} Chest\_Factor_i$$

Where i is the PCG index and j is about equal to the PCG index i divided by the CQI repeat factor CQI-repetition-factor. The channel estimation factor Chest_Factor is defined above in reference to the generation of the erasure metrics. Further, the DecodeMetric(s) are the CQI full report decoding metrics, which may include M different metrics. The CQI full report decoding metrics DecodeMetric(s) are accumulated over the CQI repeat factor CQI-repetition-factor of PCGs. Also, CQI_frm represents that the accumulation is over a CQI offset frame. During the switching period, the CQI frame quality soft decision metric may be accumulated over the region in the frame without switching indication. The CQI frame quality soft decision metric during this period is represented by the equation:

$$CqiQualityFull = \sum_{j}^{CQI\_regA} \max_{M}(DecodeMetric_m)_j \Big/ \sum_{i}^{CQI\_regA} Chest\_Factor_i$$

In this equation, CQI_regA is the duration or "region A" in a CQI frame, which carries the CQI reports. The CQI cell switch indications do not occur in the region A. Thus, this equation provides one of the signals provided to the decision making unit 34 from the CQI metric generation unit 32.

Similarly, for the differential mode, the CQI frame quality soft decision metric for the initial full reports is represented by the equation:

$$CqiQualityDiff\_Full = \max_{M}(DecodeMetric_m) \Big/ \sum_{i=0}^{Rept\_Fct-1} Chest\_factor_i$$

In this equation, Rept_Fct is the CQI repetition factor, and DecodeMetric is accumulated over the CQI repetition factor Rept_Fct number of PCGs. This equation provides another of the signals provided to the decision making unit 34 from the CQI metric generation unit 32. This calculation is not affected by the cell switch.

The CQI frame quality metric for the differential report in differential mode may be calculated in a switching period or in a non-switching period, as well. During the non-switching period, the CQI frame quality metric for the differential report in differential mode is represented by the equation:

$$CqiQualityDiff\_Diff = \sum_{i=4}^{CQI\_frm} |Diff\_Decision\_Metric_i| \Big/ \sum_{i=4}^{CQI\_frm} Chest\_factor_i$$

During the switching period, valid CQI reports occur in region A. The frame quality metric can only be obtained from region A:

$$\text{CqiQualityDiff\_Diff} = \sum_{i=4}^{CQI\_regA} |\text{Diff\_Decision\_Metric}_i| / \sum_{i=4}^{CQI\_regA} \text{Chest\_factor}_i$$

Thus, the equations provide another one of the signals to the decision making unit 34 from the CQI metric generation unit 32.

Further, some other considerations are utilized to enhance the CQI frame quality metrics provided. For instance, the CQI frame quality metrics accumulation for differential reports may be started from PCG 4 (i=4) in differential mode to avoid the effect of the full reports and repetition factor on the quality metrics. Also, the accumulation length of the channel estimation scaling factor may be the same as the accumulation length of the PCG based decoding/decision metrics.

It should be understood that the rake receiver 28, CQI recovery/decoding unit 30, CQI metric generation unit 32 and decision making unit 34 are merely an example of hardware devices or routines that may be designed using the techniques described herein. For instance, these components may be implemented as a software program, such as routines or code, as a firmware or hardware component, such as a field programmable gate array (FPGA), a digital signal processor (DSP), an application specific integrated circuit (ASIC), and/or a combination of these hardware components. Indeed, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising:
generating quality metrics from a decoding process for a received channel quality indicator (CQI), wherein the quality metrics comprise short-term soft decision quality metrics and long-term soft decision quality metrics that are associated with a quality of the received CQI, wherein the long-term soft decision quality metrics are generated by filtering frame based quality metrics over a plurality of frames;
comparing at least one of the quality metrics to a quality setting; and
determining whether to dynamically adjust a CQI channel configuration based on the comparison.

2. The method, as set forth in claim 1, wherein the CQI channel configuration comprises a R-CQICH mode setting of a full mode or a differential mode, and the comparison comprises comparing one of the long-term quality metrics to the quality setting.

3. The method, as set forth in claim 1, wherein the CQI channel configuration comprises a reverse link outer loop power control setting, and the comparison comprises comparing one of the short-term quality metrics to the quality setting.

4. The method, as set forth in claim 1, wherein the CQI channel configuration comprises a repetition factor, and the comparison comprises comparing one of the long-term quality metrics to the quality setting.

5. The method, as set forth in claim 1, comprising generating the short-term quality metrics by accumulating a plurality of quality information from the decoding process over a CQI frame.

6. The method, as set forth in claim 1, comprising generating a plurality of erasures for differential reports based on a CQI differential bit decision metric.

7. The method, as set forth in claim 1, wherein the method is performed at a base station in a wireless communications system.

8. The method, as set forth in claim 1, comprising transmitting an adjustment for the CQI channel configuration to a wireless unit.

9. A system comprising:
means for generating soft decision quality metrics from a decoding process for a received channel quality indicator (CQI), wherein the soft decision quality metrics comprise short-term quality metrics and long-term quality metrics that are associated with a quality of the received CQI, the long-term quality metrics being generated by filtering frame based quality metrics over a period of more than one frame;
means for comparing at least one of quality metrics to a quality setting; and
means for determining whether to dynamically adjust a CQI channel configuration based on the comparison.

10. The system, as set forth in claim 9, wherein the CQI channel configuration comprises a R-CQICH mode setting of a full mode or a differential mode, and the means for comparing compares one of the long-term quality metrics to the threshold quality setting.

11. The system, as set forth in claim 9, wherein the CQI channel configuration comprises a reverse link outer loop power control setting, and the means for comparing compares one of the short-term quality metrics to the threshold quality setting.

12. The system, as set forth in claim 9, wherein the CQI channel configuration comprises a repetition factor, and the means for comparing compares one of the long-term quality metrics to the threshold quality setting.

13. The system, as set forth in claim 9, wherein the means for generating quality metrics comprising a means for generating the short-term quality metrics by accumulating a plurality of quality information from the decoding process over a CQI frame.

14. The system, as set forth in claim 9, wherein the system is performed at a base station in a wireless communications system.

15. A method comprising:
generating quality soft decision metrics in a decoding process associated with a quality of the received channel quality indicator (CQI), wherein the soft decision metrics are generated using erasure metrics accumulated over a frame;
comparing one of quality soft decision metrics to a threshold quality setting; and
determining whether to dynamically adjust at least one of a mode setting, a reverse link outer loop power control setting, or a repetition factor based on the comparison.

16. The method, as set forth in claim 15, wherein the mode setting comprises a full mode or a differential mode setting.

17. The method, as set forth in claim 15, comprising transmitting an adjustment to a wireless unit if the determination is to dynamically adjust at least one of the mode setting, the reverse link outer loop power control setting, or the repetition factor.

18. The method, as set forth in claim 15, comprising generating long-term metrics by accumulating a plurality of quality metrics over a period of more than one frames.

* * * * *